United States Patent [19]
Honda et al.

[11] Patent Number: 5,444,321
[45] Date of Patent: Aug. 22, 1995

[54] INDUCTION ALTERNATING CURRENT GENERATOR AND A GENERATION METHOD

[75] Inventors: Yoshiaki Honda, Katsuta; Hitoshi Minorikawa, Mito; Hideaki Kamohara, Katsuta, all of Japan

[73] Assignee: Hitachi, Ltd., Tokyo, Japan

[21] Appl. No.: 114,247

[22] Filed: Sep. 1, 1993

[30] Foreign Application Priority Data

Sep. 3, 1992 [JP] Japan .................. 4-235611

[51] Int. Cl.⁶ .................. H02K 01/22; H02K 01/32
[52] U.S. Cl. .................. 310/263; 310/111; 310/190
[58] Field of Search .............. 310/263, 111, 180, 184, 310/190, 179, 191, 192; 322/51, 47

[56] References Cited

U.S. PATENT DOCUMENTS

| | | | |
|---|---|---|---|
| 4,446,392 | 5/1984 | Jaeschke | 310/105 |
| 4,980,595 | 12/1990 | Arora | 310/263 |
| 5,132,581 | 7/1992 | Kusase | 310/263 |
| 5,306,977 | 4/1994 | Hayashi | 310/263 |

FOREIGN PATENT DOCUMENTS

54-116610 9/1979 Japan .
61-85045 4/1986 Japan .

*Primary Examiner*—Steven L. Stephan
*Assistant Examiner*—D. R. Haszko
*Attorney, Agent, or Firm*—Evenson, McKeown, Edwards & Lenahan

[57] ABSTRACT

Object of the present invention is to provide an induction alternating current generator on vehicle and a method for generating alternating current in a generator on vehicle, which improve the efficiency of the generator by increasing magnetic flux permeating a stator core.

Second electromagnetic exciting means for generating magnetic field in the direction of repelling the leak magnetic flux between neighboring claw poles, are provided in the spaces formed by the neighboring claw poles engaging each other at a gap and first electromagnetic exciting means provided inside a pair of the rotor cores of the induction alternating current generator on vehicle.

And a method for generating alternating current by an induction alternating current generator having plural claw poles of a pair of rotor cores engaging each other at a gap and first electromagnetic exciting means as a first exciter inside the rotor cores, includes the step of controlling magnetic flux permeating a stator core outside the rotor cores by controlling second electromagnetic exciting means mounted in the spaces of the above-mentioned gaps and generating magnetic field in the direction of repelling leak magnetic flux between the claw poles.

12 Claims, 5 Drawing Sheets

INDUCTION ALTERNATING CURRENT GENERATOR AND A GENERATION METHOD

BACKGROUND OF THE INVENTION (1) Field of the Invention

The present invention relates to an apparatus and a method for generating alternate current, especially to an induction alternating current generator and an induction alternating current generating method for effectually supplying electricity to an automobile.

(2) Description of the Prior Art

Conventionally, a means aiming at improving the efficiency of an alternating current generator on vehicle was presented by a Japanese Patent Laid-Open No. 116610/1979. In the means, on taking notice of much leak magnetic flux between neighboring claw poles, the leak magnetic flux is reduced, consequently, the efficiency of an alternating current generator is increased by filling up binding material including magnetic material such as ion powder polarized in the direction of repelling the leak magnetic flux. Another means aiming at improving the efficiency and of providing permanent magnets in the gaps between the neighboring claw poles was described in a Japanese Patent Laid-Open No. 85045/1986.

However, the former means has the problems described hereinafter because of using binding material including iron powder, that is, the withstanding voltage of an exciting coil in a rotor core is remarkably worsened by adhesion of conductive material to the exciting coil, and since a large quantity of the binding material for keeping sufficient adhesive power is needed, it is difficult to get even the necessary and minimum magnetic power by using the iron powder for repelling the leak magnetic flux in the full excitation of the rotor core. Therefore, by the above-mentioned means, it can not be expected to sufficiently improve the efficiency of an alternating current generator. And the latter means has also the problem that the initial magnetic power of the permanent magnet polarized in the direction of repelling the magnetic flux of the excited rotor core is decreased by the effects of the rotor core magnetic flux and the high temperature atmosphere.

SUMMARY OF THE INVENTION (1) Objects of the Invention

The present invention has been achieved in consideration of the above-mentioned problems, and is aimed at providing an induction alternating current generator on vehicle and a method for generating an alternating current which remarkably increase effective magnetic flux permeating a stator core of the generator.

(2) Methods Solving the Problems

In order to attain the objects, according to the present invention, in an induction alternating current generator having a pair of rotor cores in the peripheral direction of which plural claw poles engage each other and a first field coil as first electromagnetic exciting means held insides the stator core, second field coils as second electromagnetic exciting means are mounted in the spaces formed by pairs of the claw poles and the first field coil. And, in the second field coils, a current is let flow in the direction of repelling the leak magnetic flux between the claw poles. In the induction alternating current generator having the above-mentioned constitution, the leak magnetic flux between the neighboring claw poles is repelled by the magnetic field generated by the second field coils and permeates the stator core as effective magnetic flux, which contributes increase of the current flowing in the stator coils. And, by regulating the magnetic flux permeating the stator core with the second field coils, it is possible to supply constant and stable electrical power to a vehicle by the induction alternating current generator.

DETAILED DESCRIPTION OF THE EMBODIMENTS

Hereinafter, details of the present invention is explained based on embodiments by referring to drawings.

Figure 1:
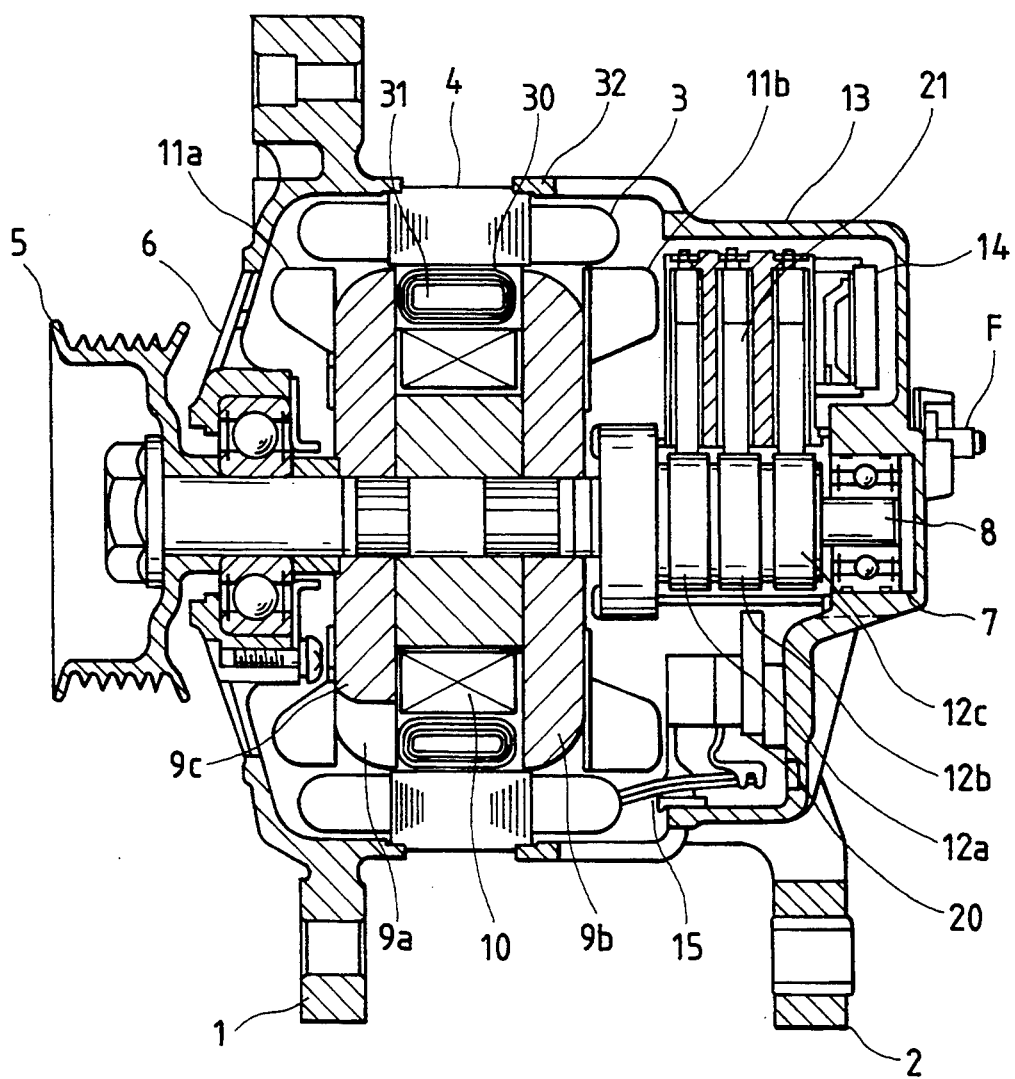
FIG. 1 is a vertical sectional side view of an alternating current generator on vehicle by the present invention.

FIG. 1 shows a vertical section view of an embodiment of an alternating current generator on vehicle based on the present invention. A pair of brackets 1 and 2 made by aluminum alloy composing a contour frame of the generator between which there is held a three phase stator coil 3 wound on a stator core 4, are fixed to each other by bolts not shown in a figure. Bearings 6 and 7 are mounted in each cylindrical bearing box projecting inward from each of the inside face centers of the brackets 1 and 2. A shaft 8 is rotatably supported by the bearings 6 and 7. Inside and slightly apart from the stator core 4 supported by the shaft 8, a pair of rotor cores 9a and 9b each of which has even number of claw poles are installed. A first field coil 10 as first electromagnetic exciting means is wound on a bobbin not shown in a figure at a yoke 9c in the annular space enclosed by the rotor cores 9a and 9b. A pulley 5 is attached to the tip of the shaft 8 projecting from the bracket 1. Fans 11a and 11b are attached to each side of the rotor cores 9a and 9b by welding, respectively. The tip of each rotor core is faced to the bracket 1 and the side of a fan guide 15, respectively, at an adequate gap. The tip of the first field coil 10 is electrically connected to slip ring electrodes 12a and 12b fixed on the shaft 8.

Figure 2:
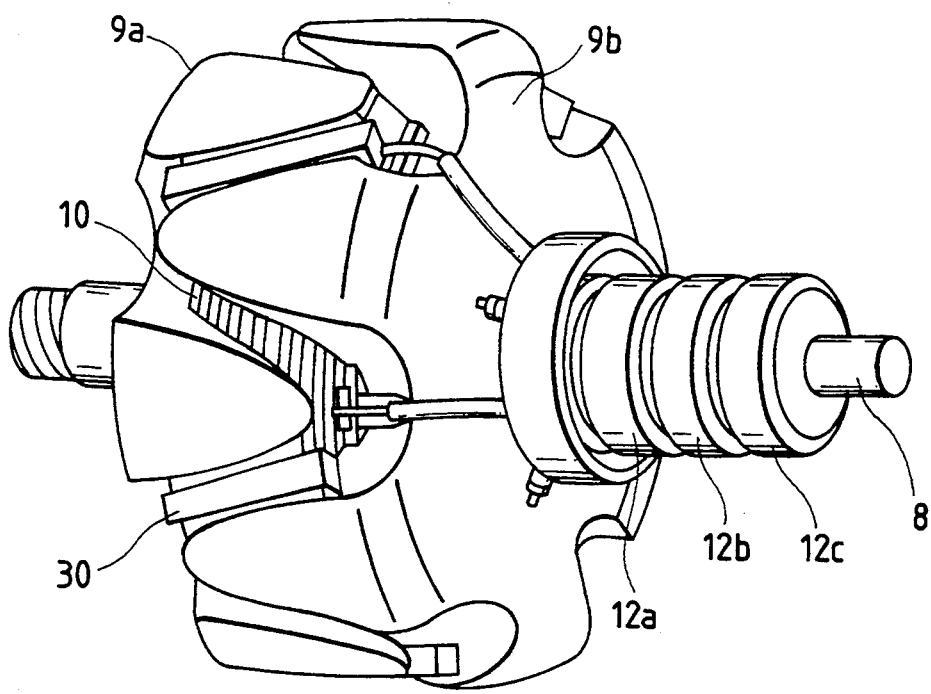
FIG. 2 is a bird's eye view of the alternating current generator.
Figure 3:
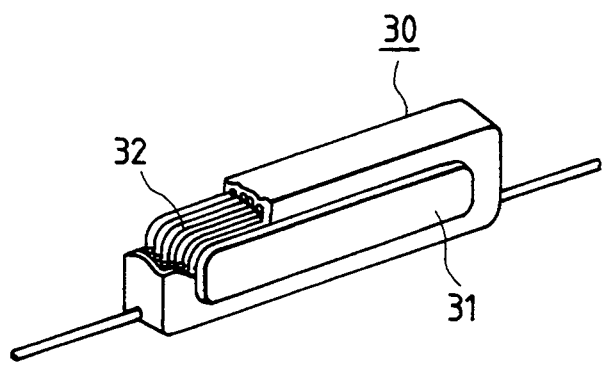
FIG. 3 is a partially sectional view of a second field coil in the alternating current generator.
Figure 4:
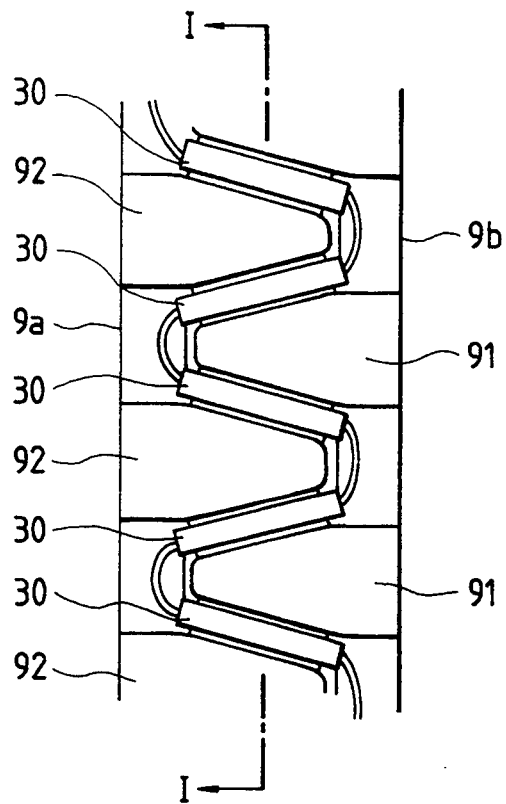
FIG. 4 is a top face view of the main part of a pair of rotor cores in the alternating current generator.
Figure 5:
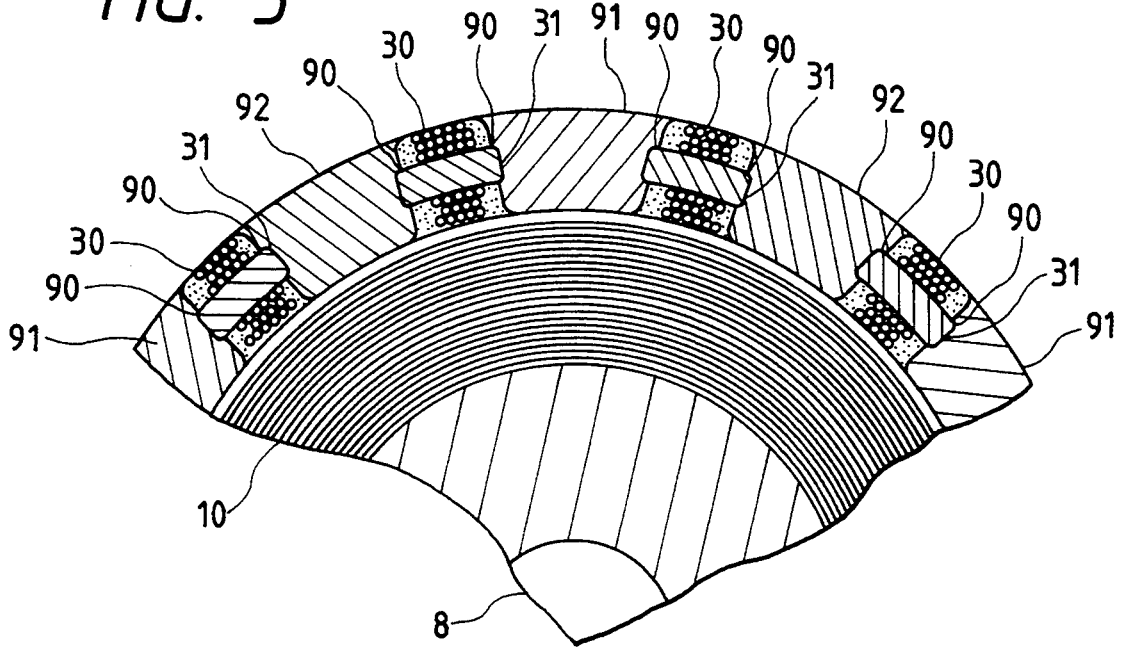
FIG. 5 is a sectional view in I—I direction of the main part of a pair of the rotor cores of FIG. 4.

As shown in FIG. 2 and FIG. 4, plural second field coils 30 as second electromagnetic exciting means are mounted in the spaces formed by the neighboring claw poles 91 and 92 of the rotor cores 9a and 9b and the outside space of the +first field coil 10. As shown in FIG. 3, each of the second field coils 30 is made by a wire 32 wound on a bar core 31 longitudinally and molded with resin in order to electrically insulate the wire 32 from the claw poles 91 and 92 and the first field coil 10. The both sides of each second field coil 30 are fitted into grooves 90 at the sides of the claw poles 91 and 92 of the rotor cores 9a and 9b, respectively. In FIG. 5, the radial sectional view of the rotor cores 9a and 9b in I—I direction of FIG. 4 is shown. The lead terminals of the second field coils 30 as well as that of the first field coil 10 are electrically connected to slip rings 12a and 12c, respectively. Since the slip ring 12a as a cathode is shared by both of the field coils 10 and 30, it is sufficient to provide three slip rings. All the second field coils 30 in FIG. 4 are connected in series.

As shown in FIG. 1, brushes 21 covered with resin which are held in a brush holder 13, slidably contact each of the slip ring 12a, 12b and 12c, respectively. Electricity is supplied to the brushes 21 through a feeding terminal F fixed to the bracket 2 on the inside face of which a regulator 14 for keeping the output voltage of the generator constant, the brush holder 13 and a diode bridge 20 for full-wave rectifying the output current of the stator coil 3 are provided.

Figure 6:
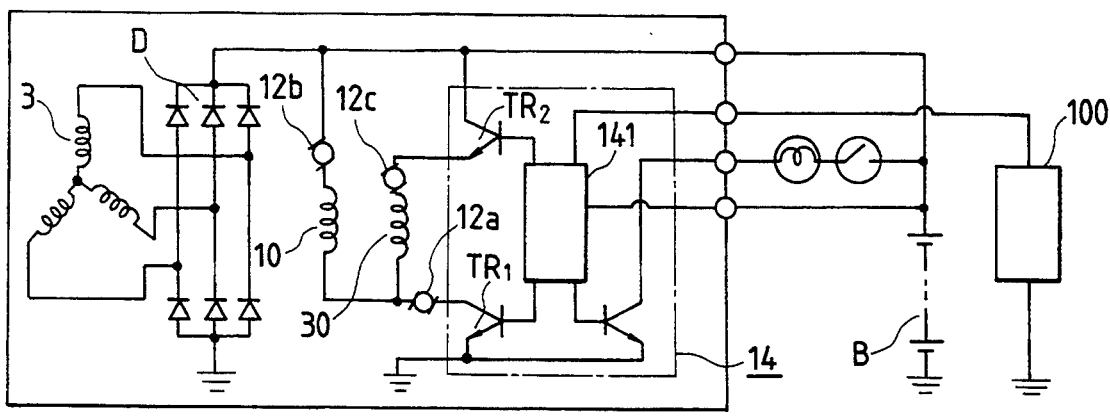
FIG. 6 is an electrical circuit diagram for the alternating current generator.

An electric circuit for controlling the generator is shown in FIG. 6. As shown in the figure, output terminals of the three phase stator coil 3 constituted by the star connection are connected to a battery B through a full-wave rectifier D. The second field coils 30 connected to a switching transistor TR2 in series is connected in parallel to the first field coil 10. Each of two terminals of the field coils 30 and 10 is earthed through the full-wave rectifier and a switching transistor TR1, respectively as shown in FIG. 4. By connecting a plurality of the second field coils 30 in series, the burning out of the coils by excess current can be avoided because the voltage applied between the feeding electrode and the earth electrode is divided to each of the coils connected in series. The current flowing in the second field coils 30 is on-off regulated by a switching transistor TR2 controlled by a control part 141 provided in the regulator 14 receiving control signals from a control unit 100 outside the generator.

Figure 8:
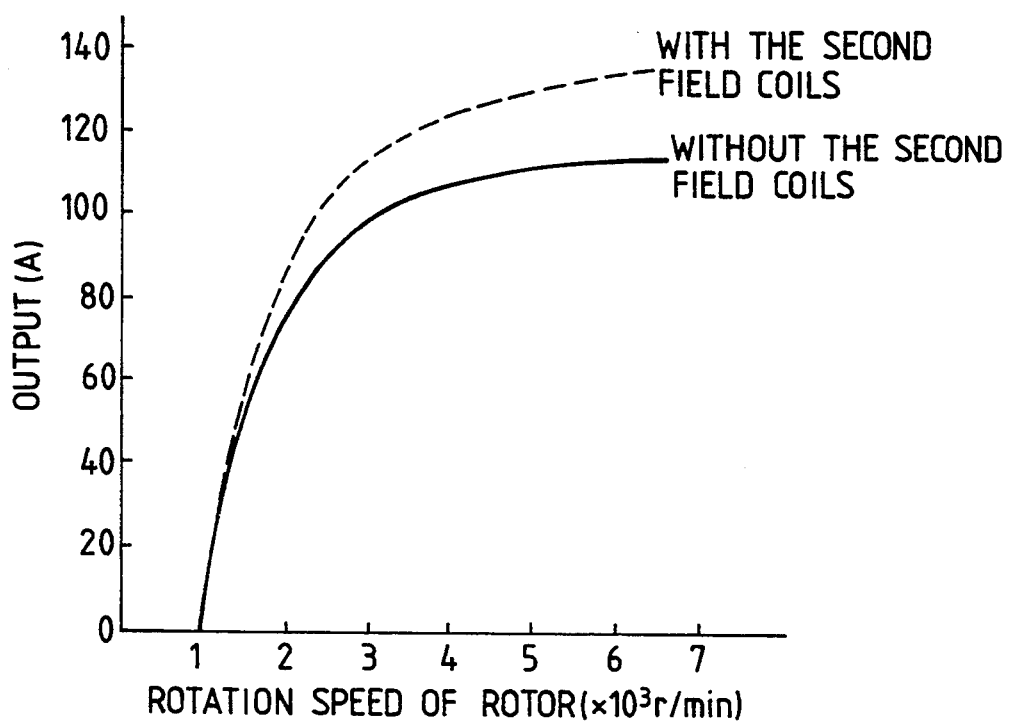
FIG. 8 is a graph showing the comparison of the output current of the generator embodying the present invention with that of a generator not embodying the present invention.

A method for operating the generator having the above-mentioned constitution are explained as follows. When a current flows in the first field coil 10 and torque by such a machine as an internal combustion engine is transmitted to a pulley 5, rotating field is generated by the rotor cores 9a and 9b. The alternating current is induced in the stator coil 3 when the rotating magnetic field crosses the stator coil 3. The alternating current generated in the stator coil 3 flows into a diode bridge D through output lead of the stator coil 3 and is converted to direct current by a full-wave rectifier comprising the diode bridge D. Since the output voltage of the generator changes according to revolving speed of the rotor, the field current of the rotor is on-off controlled by the regulator 14 so that the output voltage is kept constant. When the field current flows in the first field coil 10, a pair of rotor cores 9a and 9b are magnetized, that is, the one is polarized to the north pole and the other to the south pole. The generated magnetic flux almost permeates the stator core 4 provided slightly apart from and outside the rotor cores 9a and 9b and the remainder leaks between the neighboring claw poles 91 and 92 of a pair of the rotor cores 9a and 9b. Such leak magnetic flux does not contribute current generation in the stator. When the switching transistor TR2 is turned on and a current flows in the second fields coil 30, the leak magnetic flux decreases and the effective magnetic flux consequently increases since the magnetic flux generated by the second field coils 30 repels the leak magnetic flux between the claw magnetic poles 91 and 92, pushing it into the stator core 4. Then it is possible to increase the output current at the same revolving speed of the rotor by using the second field coils 30, comparing with a generator not having such a means for generating subsidiary magnetic flux as the second field coils 30. If the bar core 31 on which the wire 32 is wound is fitted into grooves 90 at the sides of the claw poles 91 and 92, the leak magnetic flux can be repelled more strongly and the efficiency of the current generation can be more improved since the fitting between the bar core 31 and the claw poles 91 and 92 increases the magnetic permeability of the magnetic flux generated by the second field coils 30. FIG. 8 shows the comparison of the output current of the generator embodying the present invention with that of a generator not embodying the present invention. The embodiment of the present invention can increase the output current by 20% at 5000 rpm. Since the current flowing in the second field coils 30 is below 1 A, it can be neglected comparing the current flowing in the stator coil 3.

The method for feeding each of the field coils 10, 30 is explained as follows. The first field coil 10 is fed from the anode of the split ring 12b, and the second field coils 30 from the anode of the split ring 12c. Although both of the field coils 10 and 30 share the cathode of the slip ring 12a, the feeding to the second field coils 30 can be independently controlled because the second field coils 30 are fed through the above-mentioned independent circuits. Then it is easy to control the output of the generator flexibly corresponding to the current generating states or the charging states of the battery B.

Figure 7:
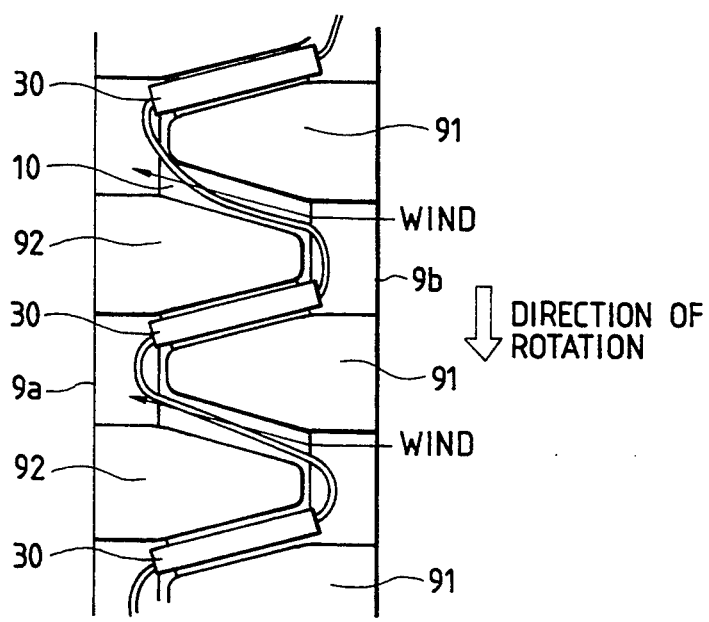
FIG. 7 is a top face view of the main part of a pair of the rotor cores of the alternating current generator in another embodiment.

Another embodiment is explained by referring to FIG. 9. The second field coils 30 are alternately mounted in the spaces formed by the neighboring claw magnetic poles 91 and 92 and the first field coil 10 as shown in FIG. 7. Since the part composed of a pair of the claw poles 91 and 92 and one of the second field coils 30 sandwiched between the two unoccupied spaces forms a parallelogram, the rotor having the above-mentioned constitution performs a role just like an axial flow fan, which improves cooling efficiency of the generator due to the increase of wind flow and consequently increases the output power of the generator.

Since means for providing permanent magnets in the spaces of the gaps between the claw poles 91 and 92 are not adopted in the alternating current generator having the above-described constitution, the generator of the present invention does not have such problems of output power worsening due to demagnetization by the magnetic flux of the first field coil 10 and by the high temperature atmosphere as a permanent magnet has.

As has been explained in the foregoing, according to the present invention, the effective magnetic flux permeating the stator core is increased and the efficiency of the generator is consequently improved, by providing means such as second field coils for generating magnetic field in the direction of repelling the leak magnetic flux between the neighboring claw poles in the spaces formed by the neighboring claw poles of the rotor cores and the first field coil provided inside the rotor core.

What is claimed is:

1. An induction alternating current generator, comprising:
   a pair of rotor cores forming an interior space, each one of said pair of rotor cores having a plurality of claw poles which engage one another forming gaps therebetween;

first means for generating electromagnetic excitation operatively arranged in the interior space for exiting said plurality of claw poles; and second means for generating electromagnetic excitation independently of said first means, said second means being operatively arranged in said gaps.

2. The induction alternating current generator according to claim 1 wherein said generator has means for regulating said second electromagnetic exciting means by control signals from a control unit outside said generator.

3. The induction alternating current generator according to claim 1 wherein said second electromagnetic exciting means are plural field coils connected in series.

4. An induction alternating current generator, comprising:

a pair of rotor cores forming an interior space, each one of said pair of rotor cores having a plurality of claw poles which engage one another forming gaps therebetween;

first means for generating electromagnetic excitation operatively arranged in the interior space for exiting said plurality of claw poles; and second means for generating electromagnetic excitation independently of said first means and in a direction so as to repel a magnetic flux leakage between said plurality of claw poles, said second means being operatively arranged in said gaps.

5. The induction alternating current generator according to claim 4 wherein said second electromagnetic exciting means are plural field coils molded with resin so as to be insulated from said pair of rotor cores and said first electromagnetic exciting means.

6. The induction alternating current generator according to claim 4 wherein said plurality of claw poles have sides in which are formed grooves, and wherein said second electromagnetic exciting means are plural field coils wound on bar cores fitted into said grooves at the sides of said claw poles.

7. The induction alternating current generator according to claim 4 wherein said second electromagnetic exciting means are alternately mounted in said gaps for insuring ventilation paths for cooling air by leaving at least one of said gaps unoccupied with said second electromagnetic exciting means.

8. The induction alternating current generator according to claim 4 wherein said second electromagnetic exciting means and said first electromagnetic exciting means inside said pair of rotor cores share a slip ring electrode for ground and are fed from each independent slip ring electrode.

9. An induction alternating current generator, comprising:

a pair of rotor cores forming an interior space, each one of said pair of rotor cores having a plurality of claw poles which engage one another forming gaps therebetween;

first means for generating electromagnetic excitation operatively arranged in the interior space for exiting said plurality of claw poles;

second means for generating electromagnetic excitation independently of said first means and in a direction so as to repel a magnetic flux leakage between said plurality of claw poles, said second means being operatively arranged in said gaps; and means for regulating said second electromagnetic exciting means via control signals from a control unit arranged outside of said generator.

10. An induction alternating current generator, comprising:

a pair of rotor cores forming an interior space, each one of said pair of rotor cores having a plurality of claw poles which engage one another forming gaps therebetween;

first means for generating electromagnetic excitation operatively arranged in the interior space for exiting said plurality of claw poles; and second means for generating electromagnetic excitation independently of said first means and in a direction so as to repel a magnetic flux leakage between said plurality of claw poles, said second means being plural field coils operatively arranged in said gaps.

11. A method for generating alternating current by an induction alternating current generator including a pair of rotor cores forming an interior space, each one of said pair of rotor cores having a plurality of claw poles which engage one another forming gaps therebetween with first means for generating electromagnetic excitation operatively arranged in the interior space for exiting said plurality of claw poles and second means for generating electromagnetic excitation independently of said first means operatively arranged in said gaps, the method comprising the steps of:

controlling a magnetic flux permeating a stator core outside said pair of rotors in accordance with the following step:

regulating said second electromagnetic excitation means mounted in the gaps so as to generate a magnetic field in a direction repelling a leakage magnetic flux between said plurality of claw poles.

12. The induction alternating current generator according to claim 2 wherein said second electromagnetic exciting means are plural field coils connected in series.

* * * * *